Figure 1:
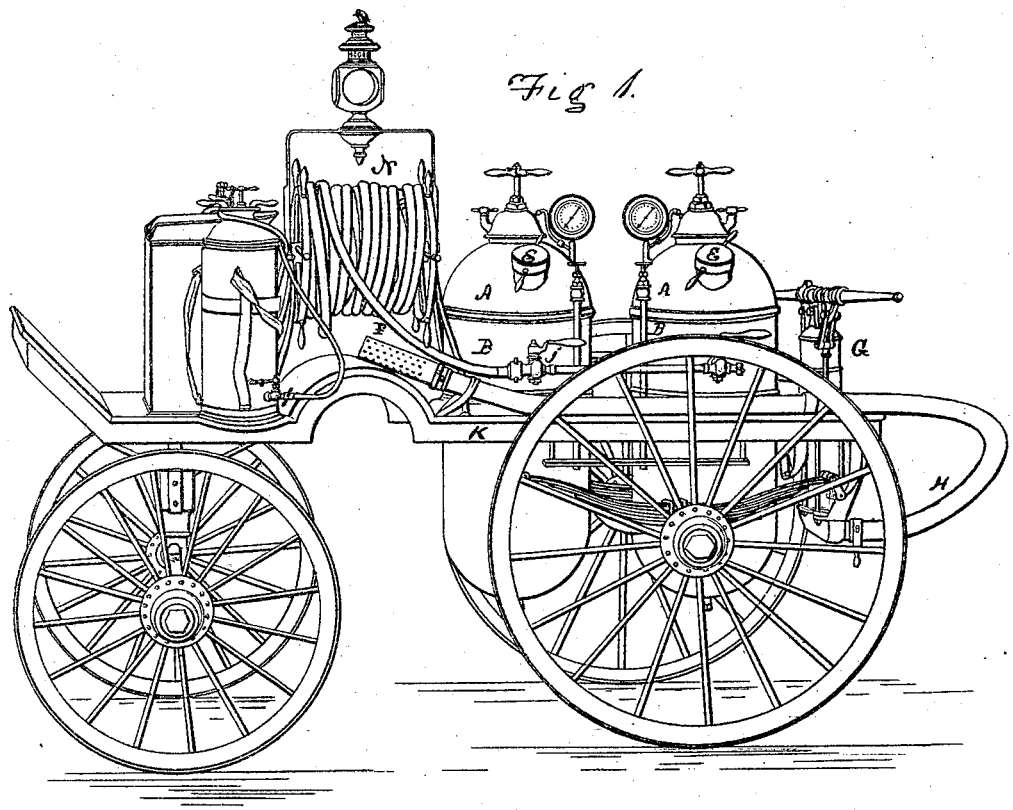

4 Sheets--Sheet 1.

J. B. STILLSON & J. A. KLEY.

Improvement in Chemical Fire-Engines.

No. 131,414. Patented Sep. 17, 1872.

ATTEST. George Mathews

INVENTORS. J. B. Stillson John A. Kley

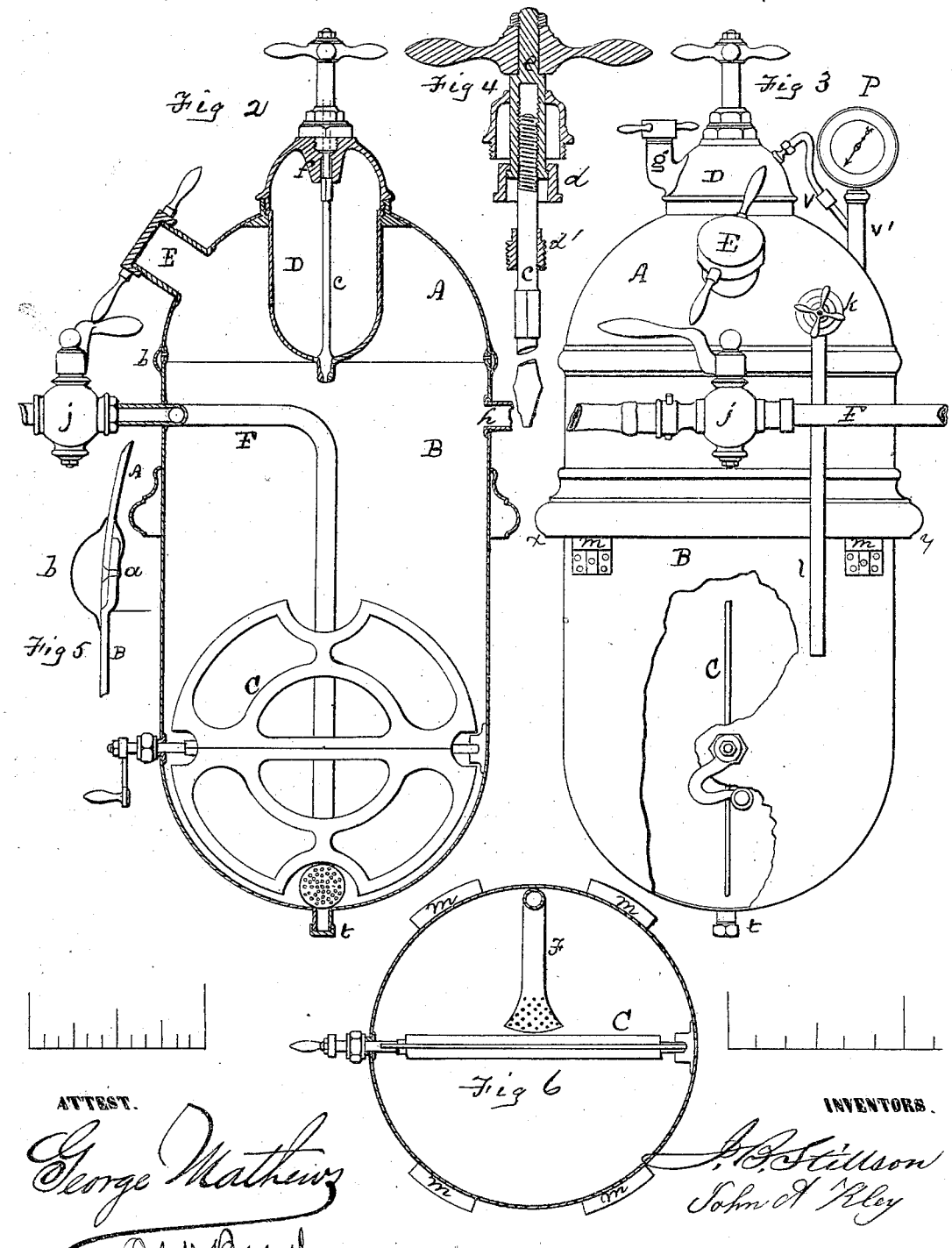

4 Sheets--Sheet 3.
J. B. STILLSON & J. A. KLEY.
Improvement in Chemical Fire-Engines.
No. 131,414. Patented Sep. 17, 1872.
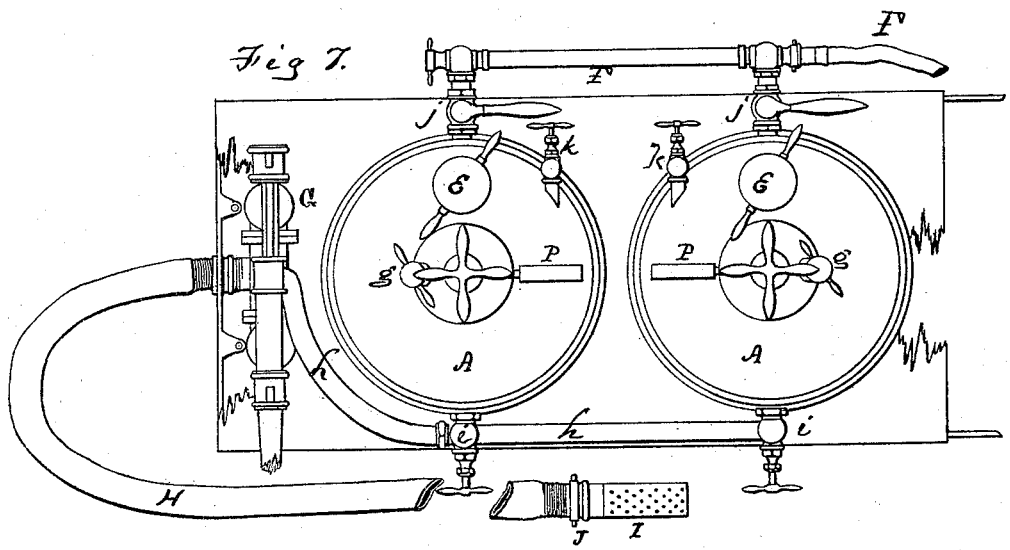
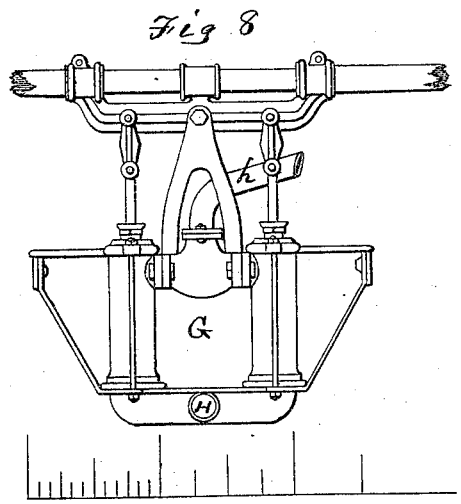
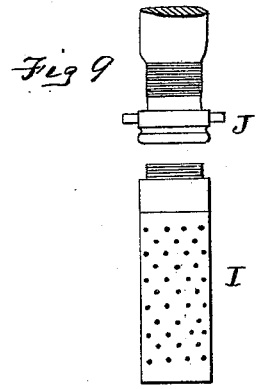
ATTEST. George Mathews
INVENTORS. J. B. Stillson, John A. Kley 4 Sheets--Sheet 4.
J. B. STILLSON & J. A. KLEY.
Improvement in Chemical Fire-Engines.
No. 131,414. Patented Sep. 17, 1872.
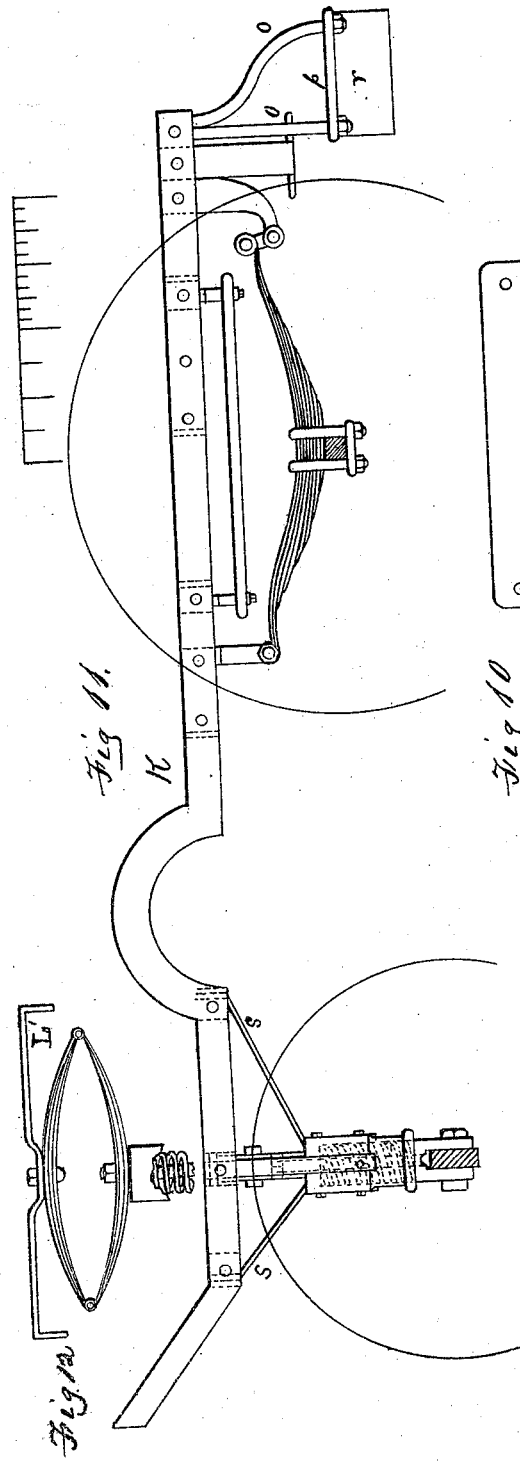
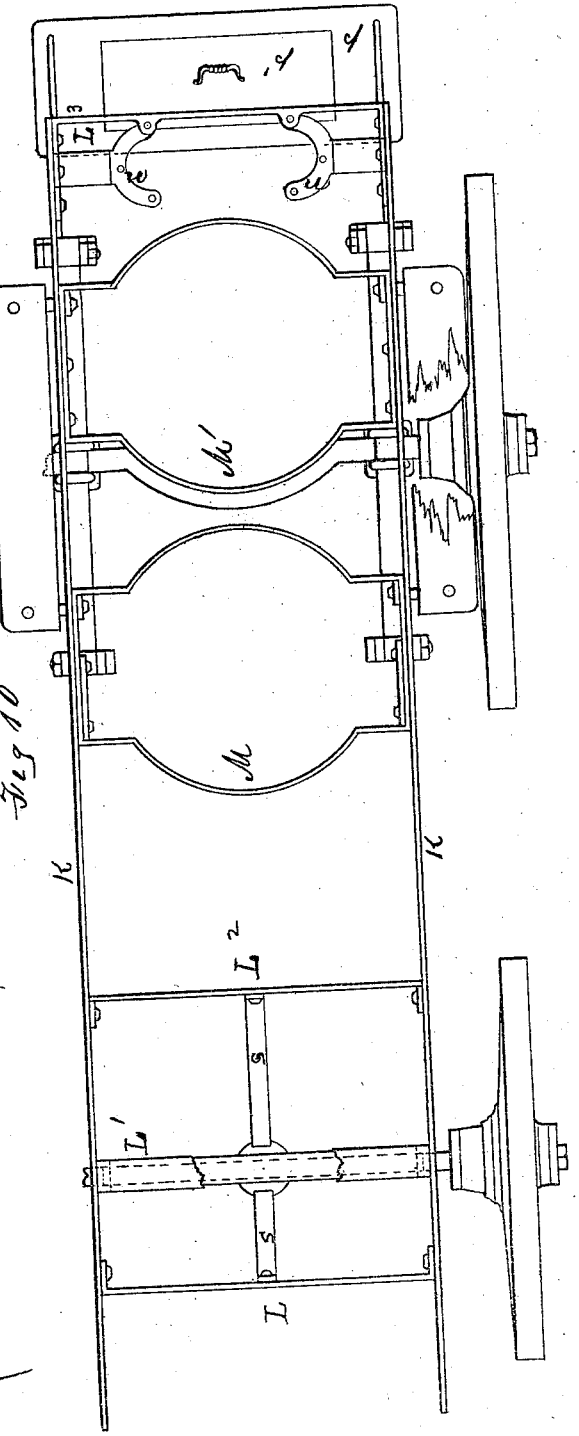
ATTEST.
INVENTORS.

UNITED STATES PATENT OFFICE.

JEROME B. STILLSON AND JOHN A. KLEY, OF CHICAGO, ILLINOIS.

IMPROVEMENT IN CHEMICAL FIRE-ENGINES.

Specification forming part of Letters Patent No. 131,414, dated September 17, 1872.

*To all whom it may concern:*

Be it known that we, JEROME B. STILLSON and JOHN A. KLEY, of the city of Chicago, in the county of Cook and State of Illinois, have invented certain new and useful Improvements in Self-Acting Fire-Engines, of which the following is a full description, reference being had to the accompanying drawing making a part of this specification, consisting of four sheets, in which—

Figure 1 represents the entire machine in perspective. Fig. 2 is a transverse vertical section of one of the tanks. Fig. 3, a side elevation of the same; Figs. 4 and 5, enlarged details; Fig. 6, a horizontal section taken at $x$ $y$, of Fig. 3; Fig. 7, a top view of the tanks and pump; Fig. 8, an end view of the pump; Fig. 9, an enlarged detail; Fig. 10, a top view of the frame; Fig. 11, a side view of the same; and Fig. 12, a detail. Figs. 2, 3, and 6, are drawn on a scale of an inch and a half to the foot; Figs. 7, 8, 10, 11, and 12, on a scale of one inch to the foot.

Our improvements relate to that class of engines in which a solution of carbonic-acid gas and water is used; and consist in combining with the gas-tanks a force-pump; in the mode of supporting the tanks upon the frame; in the peculiar construction of the bed-frame and running-gear; and in the several combinations and devices hereinafter claimed.

The tanks and force-pump are supported upon a bed-frame of iron, mounted upon wheels, represented on Sheet 4. This bed-frame consists of two side pieces, K K, three cross-bars near the front, L L$^1$ L$^2$, supports M M$'$ for the tanks, and a rear cross-bar, L$^3$. The supports for the tanks are each made of a single piece of metal, and are riveted to the side pieces K K; the four cross-bars are also riveted to the same side pieces. This frame is supported upon suitable springs in the usual manner, and four braces steady the front of the frame, two of which, *s s*, are shown; the other two extend from the side pieces K K, and are secured near the rear ends of *s s*. From the extreme rear end of this frame depend braces *o o*, which support a step, *p*, the central portion of which is in the form of a door, *p$'$*, through which access may be had to a tool-box, *r*, beneath. The tanks, two of which are used, are made in two parts, A B. The upper end of the lower part B is bent inward, while the lower portion of the upper part A fits closely over the upper end of B, and the two parts are secured together by a series of rivets, *a*, and by solder, as shown in Fig. 5. It has been customary to connect these parts together by means of broad flanges bolted together. This joint may be covered by an ornamental band, *b*. In the bottom of the tank is a stirrer, C, for the purpose of mixing the contents, which is operated from the outside by a crank. In the top of the tank is a small receptacle, D, for the acid, having an opening at the lower end communicating with the tank, which opening is closed by means of a pointed rod operated from the outside. This rod is made in two parts, *c* and *e*, the upper end of *c* being provided with a screw-thread fitting into a corresponding female screw in the lower end of *e*. Suitable stuffing-boxes *d d$'$* prevent the acid from reaching and corroding this screw-thread, so that its operation is more certain than when made in the usual manner. Alkali is introduced into the tanks through the openings E, and the tanks might be filled with water through the same openings; but it is designed to fill them by means of the force-pump. The acid is introduced into the chambers D through the openings *g*, all of which openings are tightly closed in the usual manner. P is a gage to indicate the pressure. F is a discharge-pipe which communicates with both of the tanks through the cocks *j j*, so arranged that when one is open the other may be closed. This discharge-pipe extends nearly to the bottom of each tank, and is then provided with a strainer to keep out sediment. G is a double-acting force-pump placed at the rear of the tanks, by means of which the same can be rapidly filled with water. This pump is represented upon a metal plate and secured upon supports *n n*, in any suitable manner. H is a suction-hose, so arranged that water may be drawn from an open reservoir through I, or by removing I the end J may be directly connected with a street-hydrant. *h* is a supply-pipe from the pump, communicating with both of the tanks, having cocks *i i*, so arranged that while one tank is being filled water may be shut off from the other. *k* is a valve-cock, to which is connected a pipe, *l*, extending down toward the ground, and by means of which the tanks can be relieved from undue pressure, and the gas, which remains after the water is discharged, allowed to escape. By means of this pipe $l$ gas is discharged at a point where it is not likely to discommode the operator. $k$ also serves the purpose of a water-gage. $v$ is a pipe, one end of which communicates with the pipe $v^1$, which opens into the tank, and the other end communicates with the acid-chamber D. The object of this is to equalize the pressure in the two chambers. The bottom of the tank is provided with a small opening, which is closed by a cap, $t$, through which any sediment may be removed. The tanks are provided with flanges $m$, riveted thereto, which flanges rest upon bars M M' which support the tank. The center bolt below the letters $m\ m$, in Fig. 3, is used to secure the tanks to their supporting bars. N, Fig. 1, is a hose-reel and hose.

The operation of this engine is similar to others of the same class. Alkali is placed in the main tanks, the acid in the chambers D, and the tanks filled with water by means of the pump G; then the engine is ready for use. When used the acid is allowed to escape from one receptacle into the tank below, and the carbonic-acid gas evolving, together with the water, will be forced out through F. When one tank has been emptied the other can be used at once, and while its contents are being discharged the first tank can be recharged, ready for use. If by chance the chemicals should be exhausted, the engine can still be used with considerable efficiency as a common hand fire-engine, a continuous stream of water being thrown from the tank by means of the force-pump. The pump itself is not provided with any air-chamber, but the construction and arrangement of the pump and tanks are such that there will be an air-chamber in the upper portion of each tank, serving every purpose of an an air-chamber in direct connection with the pump.

What we claim as new, and desire to secure by Letters Patent, is as follows:

1. In combination with the acid-chamber D, the discharging-rod $c\ e$, made in two parts and constructed and protected from the acid, substantially as specified.

2. The combination of the two gas-tanks with a force-pump, G, constructed and arranged to operate with either or both of such tanks, substantially as and for the purposes specified.

3. The combination of the two tanks with the pump G, suction-hose H, pipe $h$, and valves $i\ i\ j\ j$, and pipe F, so that the tanks may be operated separately or in conjunction, substantially as described.

4. The combination of the valve-cock $k$ and pipe $l$, with the tank A B, substantially as and for the purposes specified.

5. The mode herein described of securing the tanks to their supports by means of flanges $m$, and bolts, substantially as specified.

6. The bed-frame herein described, consisting of the side pieces K K, cross-bars L $L^1$ $L^2$ $L^3$, tank-supports M M', and supports $n\ n$, for the pump, all constructed substantially as specified.

J. B. STILLSON.
JOHN A. KLEY.

Witnesses:
GEORGE MATHEWS,
O. W. BOND.